US008815323B2

(12) United States Patent
Dodd

(10) Patent No.: US 8,815,323 B2
(45) Date of Patent: Aug. 26, 2014

(54) METHOD FOR THE PREVENTION OF THE DISCOLORATION OF FRUIT

(76) Inventor: Jeff Dodd, Clitheroe (GB)

( * ) Notice: Subject to any disclaimer, the term of this patent is extended or adjusted under 35 U.S.C. 154(b) by 147 days.

(21) Appl. No.: 13/375,753

(22) PCT Filed: Jun. 1, 2010

(86) PCT No.: PCT/GB2010/001081
§ 371 (c)(1),
(2), (4) Date: Jan. 18, 2012

(87) PCT Pub. No.: WO2010/139946
PCT Pub. Date: Dec. 9, 2010

(65) Prior Publication Data
US 2012/0128841 A1    May 24, 2012

(30) Foreign Application Priority Data

Jun. 1, 2009 (GB) .................................. 0909357.6
Mar. 30, 2010 (GB) .................................. 1005378.3

(51) Int. Cl.
*A23L 1/212* (2006.01)
(52) U.S. Cl.
USPC ........................................ 426/615

(58) Field of Classification Search
USPC ...................... 426/72, 74, 615, 271
See application file for complete search history.

(56) References Cited

U.S. PATENT DOCUMENTS

| 5,055,313 | A |   | 10/1991 | Warren |   |
|---|---|---|---|---|---|
| 5,376,391 | A |   | 12/1994 | Nisperos-Carriedo et al. |   |
| 5,645,880 | A | * | 7/1997 | McArdle | ........................ 426/327 |
| 5,912,034 | A | * | 6/1999 | Martin et al. | .................. 426/268 |

FOREIGN PATENT DOCUMENTS

| EP | 0423470 A1 | 4/1991 |
| EP | 0903083 A2 | 3/1999 |
| GB | 1158571 A | 7/1969 |
| JP | 2006304790 A | 11/1996 |
| WO | 9601566 A1 | 1/1996 |
| WO | 9937172 A1 | 7/1999 |
| WO | 03011058 A1 | 2/2003 |
| WO | 2010/139946 A3 | 12/2010 |

* cited by examiner

*Primary Examiner* — Helen F Heggestad
(74) *Attorney, Agent, or Firm* — McNeely, Hare & War LLP; William Hare; Simana Rao

(57) ABSTRACT

There is described a method for the prevention, mitigation or slowing of the discoloration of produce (fruit) the method comprising: (i) an optional first step of pre-dipping the produce in a chelating agent; and (ii) treating the optionally pre-dipped produce with an enzyme inhibitor.

9 Claims, No Drawings

METHOD FOR THE PREVENTION OF THE DISCOLORATION OF FRUIT

CROSS-REFERENCE TO RELATED APPLICATIONS

This application claims priority to PCT International Application No. PCT/GB2010/01081 filed on Jun. 1, 2010, and published as WO 2010/139946, which claims priority from GB Patent Application No. 0909357.6, filed Jun. 1, 2009, and GB Patent Application No. 1005378.3, filed Mar. 30, 2010, each application being incorporated herein in their entirety by reference.

FIELD OF THE INVENTION

The present invention relates to a novel composition and to novel methods related thereto.

More particularly, the invention relates a novel composition suitable for extending the storage life of fresh produce, such as fruit and vegetables. The use of the composition and the method of the invention prevents or mitigates the spoilage of such fresh produce.

BACKGROUND OF THE INVENTION

Enzymatic browning is one of the most studied reactions in fruits, vegetables and seafood. Researchers in the fields of food science, horticulture, plant physiology, including post-harvest physiology, microbiology and insect and crustacean physiology, have studied this reaction because of the diversity of its commercial impact upon growers, food processors and consumers.

Many of the research programs have demonstrated successful formulations for preserving processed fruit, vegetables, fish, poultry and meat, but these formulations have proven commercially non-viable due to, inter alia, the expense and/or limited availability of intermediates.

Appearance, flavour, texture and nutritional value are four attributes considered by consumers when making food choices. Appearance, which is significantly impacted by colour, is one of the first attributes used by consumers in evaluating food quality.

When asked to discuss discolouration or browning in foods, those involved from production to processing, usually reflect on its detrimental influence.

Discolouration or browning in fruits and vegetables also gives rise to economic losses. Increases in fruit and vegetable markets projected for the future will not occur if enzymatic discolouration or browning is not understood more and controlled. Enzymatic discolouration and browning is one of the most devastating reactions for many exotic fruits and vegetables, in particular tropical and subtropical varieties. It is estimated that over 50% of losses in fruit occur as a result of enzymatic discolouration or browning (Whitaker and Lee, 1995). Such losses have prompted considerable interest in understanding and controlling phenol oxidase enzymes in foods. Lettuce, other green leafy vegetables, potatoes and other starchy staples, such as sweet potato, breadfruit, yarn, mushrooms, apples, avocados, bananas, grapes, peaches, and a variety of other tropical and subtropical fruits and vegetables, are susceptible to discolouration or browning and therefore cause economic losses for the agriculturist. These losses are greater if discolouration or browning occurs closer to the consumer in the processing scheme, due to storage and handling costs prior to this point.

The control of discolouration or browning from harvest to consumer is therefore very critical for minimising losses and maintaining economic value to the agriculturist and food processor. Discolouration or browning can also adversely affect flavour and nutritional value of fruit and vegetables.

Decolouration, e.g. browning, of fresh produce, such as, fruit and vegetables is undesirable, especially for retailers and customers. Decolouration is anaesthetic and perceived by consumers to indicate that the produce is spoiled. Therefore, processors and retailers aim to prevent or minimise decolouration.

Such decolouration will generally not occur in undamaged or unprepared produce. However, there is an increased demand for prepared fruits and vegetables and therefore the prevention or mitigation of decolouration of such prepared foods is especially important for the retailer of such produce. If the produce is discoloured then the consumer will generally not purchase the product as it is perceived as being damaged.

Enzymic browning is an important colour reaction in fruit and vegetables and in some instances enzymic browning is desirable, for example in developing the flavour of tea and developing the colour and flavour in dried fruits such as figs or raisins.

However, enzymatic browning of many fruits and vegetables may be undesirable and can create economic losses for growers, retailers, etc. This decolouration or browning does not occur in undamaged or uncut fruit and/or vegetables since natural phenolic substrates are separated from the enzyme(s) responsible for browning hence the decolouration will not occur. However once the produce has been cut, peeled, damaged so that the flesh of the fruit or vegetable is exposed to air, rapid decolouration or browning will occur. This discolouration or browning, of produce such as fruit and vegetables, is often referred to as "enzymic browning" or "enzymatic browning". Enzymic/enzymatic browning comprises a chemical or biochemical process which involves the enzyme polyphenol oxidase (phenolase), and other enzymes, such as, tyrosinase and catecholase. The enzyme is released when the fruit or vegetable is cut or damaged and discolouration is generally due to enzymic oxidation of phenols to orthoquinones, etc. the orthoquinones very quickly polymerise to form coloured/brown pigments known as melanins. Melanins are a class of pigments which are derived from the amino acid tyrosine and it is the melanin, or similar compounds in its class, which produces the brown colour observed in fresh produce as hereinbefore described.

The increase in the sale of pre-prepared fruits and vegetables has increased the need for the prevention of discolouration so as to increase at least the perceived shelf life of such produce.

Conventionally, enzymatic browning is controlled with chemicals (such as sodium bisulphite), or by destroying the responsible chemicals with heat, for example, blanching is commonly used destroy the enzyme(s) and to preserve the colour in fruit and/or vegetables. Lemon juice and other acids have been used to preserve the colour in fruit, particularly apples, by lowering the pH.

However, it is important to understand the discolouration process more fully. To enable the discolouration to occur four essential components are required to be present:
1. Oxygen
2. Enzyme
3. Prosthetic group—Copper
4. Substrate Therefore to introduce some control of enzymic browning one or more of these components needs to be eliminated from the reaction. A number of considerations need to be observed in order to understand what preventative action can be initiated to minimise browning.

Oxygen

Removing oxygen is both difficult and impractical. Fresh produce, such as fruit and vegetables, requires oxygen to maintain normal, or a degree, of respiration. Furthermore, removal of oxygen can favour the growth of anaerobic pathogenic organisms, such as *Clostridium perfringens, Clostridium botulinum* and *Listeria monocytogenes*.

Enzyme

Phenolase enzymes are not easily removed from fresh produce. Heating or blanching treatment has been used for many years, whilst this does inhibit phenolase and other enzymes, it also causes undesirable softening and may itself cause the formation of black discolouration, for example, as in potatoes often referred to as "after cooking darkening" or "ACD"

Copper

Copper or iron accelerates the rate of the enzymatic browning. This can be easily observed when fruit is cut with a rusty knife or mixed in a copper bowl. The use of a chelating agent, such as, EDTA, phosphate based compounds, e.g. sodium acid pyrophosphate, and citric acid have been investigated, but have generally been unsuccessful in preventing phenolase decolouration.

Polyphenol Oxidase (PPO)

Polyphenol Oxidase (PPO) enzymes catalyse the o-hydroxylation of mono-phenols (phenol molecules in which the benzene ring contains a single hydroxyl substituent) to 0-phenol molecules containing two hydroxyl substituent's). They can also further catalyse the oxidation of o-diphenols to produce o-quinones. It is this rapid polymerisation of o-quinones to produce black, brown or red pigments (polyphenol) that is the cause of discolouration or browning in fruit and certain vegetables.

The amino acid tyrosine contains a single phenolic ring that may be oxidised by the action of PPO to form o-quinones. Hence PPO may also be referred to as tyrosinase. Polyphenol Oxidase is found in fruit, e.g. apples, and is the enzyme responsible for the fruit turning brown. However discolouration or browning is not unique to apples. A mixture of mono-phenol oxidase and catechol oxidase enzymes is present in nearly all plant tissue and can also be found in bacteria, animals and fungi.

Action of Polyphenol Oxidase

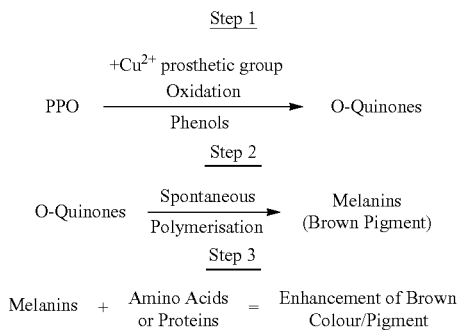

However, a disadvantage with many conventionally known anti-browning agents is their inability to penetrate fruits and/or vegetables quickly.

Sulphites, such as sodium metabisulphite, are known to penetrate fruits and vegetables, quickly and have been used extensively with root vegetables, such as potatoes. However, the use of sulphites is disadvantageous in that, when opening sulphite treated pre-packed vegetables, such as potatoes, there can be a "whiff" of a sulphurous odour.

Other potential anti-browning agents have been investigated including, for example, anti oxidants, acidulants, chelating agents, enzyme inhibitors and inorganic salts. However, many of them suffer from the disadvantage that they are expensive and/or not commercially available.

U.S. Pat. No. 5,939,117 describes a calcium ascorbate composition which is suitable as an anti-browning composition however, such a composition is disadvantageous in that, inter alia, large amounts of ascorbate are required to be use which is undesirable and costly.

SUMMARY OF THE INVENTION

We have now developed a novel method for the prevention, mitigation or slowing of the discolouration of produce (fruit) the method comprising:
(i) an optional first step of pre-dipping the produce in a chelating agent; and
(ii) treating the optionally pre-dipped produce with an enzyme inhibitor.

Preferentially the chelating agent is one which has an affinity to copper or iron; and salts thereof. Such a chelating agent is advantageously an acidulant which may also reduce the pH of the environment. Examples of such a chelating agent are organic chelating acids, such as, citric acid or a combination of citric acid and tannic acid, and derivatives thereof and combinations thereof. A preferred chelating agent is a combination of citric acid and tannic acid. When the chelating agent comprises a combination of citric acid and tannic acid the ratio of a citric acid:tannic acid may be from about 1:10 to 10:1, preferably about 1:5 to 5:1, more preferably from about 1:2 to 2:1, e.g. about 1:1.

The amount of chelating agent present may vary depending upon, inter alia, the substrate being treated. However, the amount of chelating agent, e.g. tannic acid/citric acid combination, present may be from about 0.1% to about 5% (w/v), preferably from about 0.1% to about 4% (w/v).

A variety of enzyme inhibitors may be utilised in the process of the invention, however, preferentially the enzyme inhibitor is a phenolase inhibitor, for example, which has an effect on phenolase by reducing the pH of the environment to below 4 the level at which phenolase is inactivated. Such an enzyme inhibitor may comprise a combined treatment of an acidulant and a reducing agent. In the combined treatment according to this aspect of the invention may comprise the use separately, sequentially or simultaneously of an acidulant and a reducing agent. A preferred enzyme inhibitor is natural organic acid enzyme inhibitor, e.g. a naturally occurring organic acid, such as, tannic acid, and derivatives thereof.

Thus, it will be understood that tannic acid may have a dual function in the present invention of acting as both a chelating agent and an enzyme inhibitor.

The person skilled in the art will understand that tannic acid is generally a mixture of polyphenols with a pKa of about 6, commercially available tannic acid is suitable for use as a chelating agent and/or an enzyme inhibitor in the present invention. The natural organic acid is enzyme inhibitor may optionally be dissolved in an acidic solution, for example, an aqueous solution of ascorbic acid/glycerol.

The enzyme inhibitor may also include an enzyme carrier, such as a d-glucosamine polysaccharide, e.g. chitosan. When chitosan is present it may be in an amount of from 0.01 to 1% (w/v)

Preferentially, the method of the invention comprises the simultaneous treatment of produce (fruit) with a combination of a chelating agent and an enzyme inhibitor, and optionally an antioxidant, a flavour enhancer and/or a sugar. Thus, the combination of a chelating agent and enzyme inhibitor, and optionally an antioxidant a flavour enhancer and a sugar, may be present together in a solution and the produce may be dipped in the solution to achieve the desired effect.

The one or more of an antioxidant, a flavour enhancer and a sugar may comprise materials conventionally known to the person skilled in the art. However, although a variety of antioxidants may be used a preferred antioxidant is erythorbic acid ((2R)-2-[(1R)-1,2-dihydroxyethyl]-4,5-dihydroxyfuran-3-one), and salts thereof, such as, sodium erythorbate. A further preferred antioxidant may be kojic acid (5-hydroxy-2-(hydroxymethyl)-4-pyrone), or a salt thereof. Kojic acid is also known to be a chelating agent. A preferred antioxidant in the present invention may be a combination of erythorbic acid, or a salt thereof and kojic acid, or a salt thereof.

The amount of the antioxidant, e.g. a mixture of two or more of erythorbic acid/erythorbate salt/kojic acid, present may also vary and may be from about 0.25% to about 6.0% (w/v), preferably from about 0.5% to about 5% (w/v), more preferably from about 1% to about 4% (w/v). When the antioxidant comprises a mixture or complex of erythorbic acid/erythorbate salt/kojic acid the ratio of erythorbic acid/erythorbate salt:kojic acid may be from about 1:10 to 10:1, preferably about 1:5 to 5:1, more preferably from about 1:2 to 2:1, e.g. about 1:1.

In one aspect of the invention the acidulant may be an acidified salt, such as, acidified sodium chloride, e.g. sodium hydrogen sulphate ($NaHSO_4$). The modified acidified salt may be a mixture of sodium hydrogen sulphate as hereinbefore described and erythorbic acid/erythorbate salt complex, e.g. 0.1 to 2. % w/w). The enzyme inhibitor may function as an acidulant and thereby has an inhibitory effect on phenolase, for example, by reducing the pH to below the level at which is required to inactivate phenolase. The optimum pH of phenolase activity varies with the source of the enzyme and the particular substrate, e.g. fruit or vegetable, etc., but generally phenolase has an optimum activity at a pH of from 6 to 7. Therefore, according to this aspect of the invention the acidulant is selected from those that will reduce the pH to below 4. In an especially preferred aspect of the invention the acidulant will reduce the pH to about 3. In an especially preferred aspect of the invention the acidulant will reduce the pH to about 2.84.

A variety of reducing agents or antioxidants may be used which are known to the person skilled in the art. Thus, a preferred reducing agent or antioxidant is erythorbic acid/erythorbate salt combination. Erythorbic acid/erythorbate is a reducing agent which functions as a free radical scavenger preventing oxidation by altering the REDOX potential of the system and reduces undesirable oxidative products. Erythorbic acid/erythorbate salt complex generally acts as an antioxidant in that oxygen preferentially reacts with the erythorbic acid/erythorbate salt complex, rather than the phenolic compounds in the fruit or vegetables and therefore decolouration does not begin until the entire erythorbic acid/erythorbate salt complex is used up. Furthermore, the erythorbic acid/erythorbate salt complex reduces any orthoquinones that are present to colourless diphenols.

According to one aspect of the invention we provide a method as herein before described wherein the pre-dipping step is present.

According to an alternative aspect of the invention we provide a method as hereinbefore described wherein the pre-dipping step is absent.

Therefore, according to a further aspect of the invention we provide a composition suitable for the prevention of the discolouration of produce (fruit) comprising an optional pre-dipping chelating component and an enzyme inhibitor component.

The chelating component and enzyme inhibitor component are each as hereinbefore described.

According to one aspect of the invention we provide a composition as hereinbefore described in which the pre-dipping component is present.

According to an alternative aspect of the invention we provide a composition as hereinbefore described in which the pre-dipping component is absent.

According to a yet further aspect of the invention we provide a kit suitable for the prevention of the discolouration of produce (fruit) the kit comprising:
  (i) an optional pre-dipping component; and
  (ii) an enzyme inhibitor component.

According to one aspect of the invention we provide a kit as hereinbefore described in which the pre-dipping component is present.

According to an alternative aspect of the invention we provide a kit as hereinbefore described in which the pre-dipping component is absent.

In the composition or kit as hereinbefore described, the optional pre-dipping component may comprise a chelating agent. Thus, as hereinbefore described the chelating agent should have an affinity to copper or iron and salts thereof. It will be understood that more than one chelating agent may be present, for example, a copper selective chelating agent may be combined with an iron selective chelating agent. The chelating agent may be an acidulant which may reduce the pH of the environment, such as citric acid.

In the composition or kit as hereinbefore described, the enzyme inhibitor may comprise a combined treatment of an acidulant, reducing agent and an enzyme inhibitor such as tannic acid, and optionally acidified salt (sodium hydrogen sulphate). Therefore, the acidulant is selected from those that will reduce the pH to below 4. In an especially preferred aspect of the invention the acidulant will reduce the pH to about 2.84.

In the composition or kit as hereinbefore described, the reducing agent or antioxidant may preferentially be erythorbic acid/erythorbate salt complex. The binding agent may be chitosan, According to yet a further aspect of the invention we provide produce (fruit) treated with a process, kit or composition as hereinbefore described. Such produce is advantageous in that, inter alia, if it has been peeled sliced or diced, it has a shelf life. By the term shelf life used herein, we mean the period for which the produce may be kept without discolouration and alteration to texture and taste occurring.

By the term "shelf life" used herein, we mean the period for which the produce may be kept without discolouration and alteration to colour, texture and taste occurring.

We especially provide produce (fruit) as hereinbefore described wherein the produce or fruit is the fruit of the African baobab (or monkey bread) tree.

The invention will now be described by way of example only.

EXAMPLE 1

Anti Browning of Fruit Traditional and Exotic

This study is focussed on:
1. The Anti Browning) of fruit using a two phase treatment with Citric acid (Pre-wash) and tannic acid (Enzyme Inhibitor)
2. The inhibitors are microbiologically safe but are equally anti microbial themselves.
3. Commercially feasible, cost effective as a preservative and by extending the shelf life of the produce.
4. Minimising the need to modify in-house processing plant and equipment.

The study takes into account the relevance and importance of retaining by minimising loss of:
1. Natural flavour
2. Colour
3. Texture
4. Overall appearance Part (1) of Study—

The Anti Browning of Apples, Bananas, Plums Melons, Pineapple, Mangos, Pears, Kiwi Fruit, Strawberries and Raspberries.

The Pre Dip:
1. Is a blend of the organic acidulant Tannic Acid/Citric Acid functions as a chelating agent, chelating the copper at the enzyme—active site.

The Enzyme Inhibitor:
2. Is a natural intermediate Tannic Acid/Erythorbic Acid/Erythorbate/Chitosan solution. Tannic acid which functions as an enzyme inhibitor has an inhibitory effect on phenolase by reducing the pH to below 4 the level at which phenolase is inactivated. The optimum pH of phenolase activity varies with the source of the enzyme and the particular substrate, but generally it has an optimum pH of 6-7.

and

Erythorbic Acid/Erythorbate complex a reducing agent which functions as a free radical scavenger preventing oxidation by altering the REDOX potential of the system and reduces undesirable oxidative products. The main role of Erythorbic Acid/Erythorbate complex is to reduce the orthoquinones to colourless diphenols.

and

Chitosan/Baobab in this application may be used as an enzyme carrier with anti microbial properties.

Preparation:

The concentrations of the Prewash and Enzyme Inhibitor used are preferably kept to a minimum—

Pre Dip:
Citric Acid needs to be 0.10% to about 4.00% (w/v).

Enzyme Inhibitor
Tannic Acid needs to be 1.00% to about 4% (w/v), Erythorbic acid/erythorbate complex and chitosan. 0.01% to about 1.0%

Packaging:
The fruit after treatment were stored in polythene bags which are semi permeable to oxygen and carbon dioxide so an equilibrium** concentration of both gases may be established when the rate of gas transmission through the bag is equal to the rate of respiration (this is "equilibrium modified atmosphere" or "EMA") so as to maintain aerobic conditions required for regular respiratory activity of the Fruit.

**Preferably the equilibrium modified atmosphere in the bag is about 1%-10% oxygen and 1%-10% carbon dioxide under refrigerated conditions at temperature of 5° C.

Absence of oxygen (anaerobic conditions) can result in off-flavour development particularly in peeled potatoes facilitating toxin production by microorganisms, for example, *Clostridium botulinum*, at storage temperatures above 4° C.-5° C. Our research into the use of semi permeable polythene bags has, after treatment, facilitated a shelf life of 22 days.

Mode of Application:
1. The diced apples (Royal Gala, Granny Smiths and Golden Delicious) are pre dipped for 1-2 minutes by mobile immersion in the pre-wash
2. These are then dipped for 2 minutes in the enzyme inhibitor
3. The diced apples are then drained and packed into semi-permeable polythene bags then placed into cold storage at 5° C.-7° C.
4. The diced apples were then examined daily—visually for any colour change, taste and texture and then photographed.
5. Controls were also prepared:
    Diced/sliced apples (Un treated)
    Diced/sliced apples dipped in potable cold water.
    Diced/sliced apples dipped in Pre-Dip
    Diced/sliced apples dipped in Results:
1. After 4 days the treated apples remained in very good condition retaining original taste, colour and texture.
2. On the 8th day diced apples remained in very good condition retaining original taste, colour and texture.
3. Day 12 diced apples remained in very good condition retaining original taste, colour and texture.
4. Day 16 there was no evidence of any deterioration the fruit remained in very good condition retaining original taste, colour and texture.
5. Day 22 some of the sliced diced apples were beginning to exhibit signs of very slight browning.
6. Day 23 most of the sliced diced apples had begun to deteriorate exhibiting darker browning and a general breakdown in texture.

Diced/sliced apples dipped in potable cold water—after day one (1) very light browning was observed.

Diced/sliced diced apples dipped in Pre-Dip—after two (2) days light browning was observed. Taste as expected for Diced apples. Texture firm.

Diced/sliced apples dipped in Enzyme Inhibitor—after 4 days some of the fruit exhibited slight light browning. Taste as expected for diced apples. Texture firm.

Preliminary Anti Browning Research Test Results for Fruit
The Enzyme Inhibitor System was operating at pH 2.56.
The sliced apples were packed into semi permeable poly bags and stored/refrigerated at 6° C.

Controls Sliced Apples
Sliced Apples untreated—after day one (1) hour very light browning was observed.
Sliced Apples dipped in potable cold water—after day one (1) very light browning was observed.
Sliced Apples dipped in Pre-Dip—after two (2) days light browning was observed. Taste as expected for the variety of apples so described. Texture firm.
Sliced Apples dipped in Enzyme Inhibitor—after nine (9) days some of the apples exhibited slight light browning. Taste as expected for apples. Texture firm.

Pre-Washed/Enzyme Inhibitor Dip

After four (4) days the treated sliced packed apples remained in very good condition retaining original taste, colour and texture.

On day eight (8) sliced apples remained in very good condition retaining original taste, colour and texture.

On day twelve (12) sliced apples remained in very good condition retaining original taste, colour and texture.

On day sixteen (16) there was no evidence of any deterioration. The sliced apples remained in very good condition retaining original taste, colour and texture.

On day twenty two (22) some of the sliced apples were beginning to exhibit signs of very slight browning.

On day twenty three (23) more of the sliced apples had begun to deteriorate exhibiting darker browning and a general breakdown in texture.

Taste as expected for sliced. In the case of the more exotic fruits the taste was noticeably more obvious. Texture firm.

The Results for Pears, Plums, Bananas, Mangos, Kiwi Fruit, Raspberries and Strawberries.

The Enzyme Inhibitor System was operating at pH 2.56. The sliced fruit were packed into semi permeable poly bags and stored/refrigerated at 6° C.

Pears-Normally achieve <5-6 days shelf life

| Sliced Fruit | Day | Daily Observation | Comments |
|---|---|---|---|
| Pears | 1 | Appearance: Excellent natural colour | |
| | | Taste: Pear, | Very slight acidic |
| | | Texture: Firm | |
| Pears | 3 | Appearance: Excellent natural colour | |
| | | Taste: Pear. No acidic taste | Very obvious pear taste |
| | | Texture: Firm | |
| Pears | 5 | Appearance: Excellent natural colour | |
| | | Taste: Pear. No acidic taste | Very obvious, intense pear taste |
| | | Texture: Firm | |
| Pears | 10 | Appearance: Excellent natural colour | |
| | | Taste: Pear. No acidic taste | Very obvious, intense pear taste |
| | | Texture: Firm | |
| Pears | 12 | Appearance: Pale grey | |
| | | Taste: Not edible | |
| | | Texture: signs of deterioration | Not edible |

Plums-Normally achieve <4 days shelf life

| Sliced Fruit | Day | Daily Observation | Comments |
|---|---|---|---|
| Plums | 1 | Appearance: Excellent natural colour | |
| | | Taste: Plum, | Very slight acidic |
| | | Texture: Firm | |
| Plums | 3 | Appearance: Excellent natural colour | |
| | | Taste: Plum. No acidic taste | Very obvious plum taste |
| | | Texture: Firm | |
| Plums | 5 | Appearance: Excellent natural colour | |
| | | Taste: Plum. No acidic taste | Very obvious, intense plum taste |
| | | Texture: Firm | |
| Plums | 8 | Appearance: Excellent natural colour | |
| | | Taste: Plum. No acidic taste | Very obvious, intense plum taste |
| | | Texture: Firm | |
| Plums | 10 | Appearance: Silvery whitish specs | Not edible |

Bananas-Normally achieve <3 days shelf life.

| Sliced Fruit | Day | Daily Observation | Comments |
|---|---|---|---|
| Bananas | 1 | Appearance: Excellent natural colour | |
| | | Taste: Banana, | Very slight acidic |
| | | Texture: Firm | |
| Bananas | 3 | Appearance: Excellent natural colour | |
| | | Taste: Banana. No acidic taste | Very obvious Banana taste |
| | | Texture: Firm | |
| Bananas | 5 | Appearance: Excellent natural colour | |
| | | Taste: Banana. No acidic taste | Very obvious Banana taste |
| | | Texture: Firm | |
| Bananas | 6 | Appearance: Excellent natural colour | |
| | | Taste: Banana No acidic taste | Very obvious Banana taste obvious, intense plum taste |
| | | Texture: slight softness to Firm | |
| Bananas | 7 | Appearance: Black rings present | |
| | | Taste: Not edible | Not edible |
| | | Texture: soft | |

Mangos-Normally <3 days shelf life

| Sliced Fruit | Day | Daily Observation | Comments |
|---|---|---|---|
| Mangos | 1 | Appearance: Excellent natural colour | |
| | | Taste: Mango | Very slight acidic |
| | | Texture: Firm | |
| Mangos | 3 | Appearance: Excellent natural colour | |
| | | Taste: Mango No acidic taste | Very obvious plum taste |
| | | Texture: Firm | |
| Mangos | 5 | Appearance: Excellent natural colour | |
| | | Taste: Mango No acidic taste | Very obvious, intense plum taste |
| | | Texture: Firm | |
| Mangos | 6 | Appearance: Excellent natural | |
| | | Taste: Mango No acidic taste | Very obvious, intense plum taste |
| | | Texture: slight softness to Firm | |
| Mangos | 7 | Appearance: Black rings present | |
| | | Taste: Not edible | Not edible |
| | | Texture: soft | |

| Kiwi Fruit-Normally <4 days shelf life ||||
| --- | --- | --- | --- |
| Sliced Fruit | Day | Daily Observation | Comments |
| Kiwi Fruit | 1 | Appearance: Excellent natural colour | |
| | | Taste: Kiwi Fruit | Very slight acidic |
| | | Texture: Firm | |
| Kiwi Fruit | 3 | Appearance: Excellent natural colour | |
| | | Taste: Kiwi Fruit No acidic taste | Very obvious kiwi fruit taste |
| | | Texture: Firm | |
| Kiwi Fruit | 5 | Appearance: Excellent natural colour | |
| | | Taste: Kiwi Fruit No acidic taste | Very obvious intense kiwi taste |
| | | Texture: Firm | |
| Kiwi Fruit | 6 | Appearance: Excellent natural colour | |
| | | Taste: Kiwi Fruit No acidic taste | Very obvious, intense kiwi taste |
| | | Texture: slight softness to Firm | |
| Kiwi Fruit | 7 | Appearance: Black rings present | |
| | | Taste: Not edible | Not edible |
| | | Texture: soft | |

| Raspberries-Normally <3 days shelf life ||||
| --- | --- | --- | --- |
| Sliced Fruit | Day | Daily Observation | Comments |
| Raspberries | 1 | Appearance: Excellent natural colour | |
| | | Taste: Raspberry | Very slight acidic |
| | | Texture: Firm | |
| Raspberries | 3 | Appearance: Excellent natural colour | No acidic taste |
| | | Taste: Raspberry No acidic taste | Very obvious Raspberry taste |
| | | Texture: Firm | |
| Raspberries | 5 | Appearance: Excellent natural colour | |
| | | Taste: Raspberry No acidic taste | Very obvious, intense Raspberry |
| | | Texture: Firm | |
| Raspberries | 6 | Appearance: tissue breaking down | |
| | | Taste: | Visually Not edible |
| | | Texture: Very soft | |

| Strawberries-Normally <4 days shelf life ||||
| --- | --- | --- | --- |
| Sliced Fruit | Day | Daily Observation | Comments |
| Strawberries | 1 | Appearance: Excellent natural colour | |
| | | Taste: Strawberry | Very slight acidic |
| | | Texture: Firm | |
| Strawberries | 3 | Appearance: Excellent natural colour | |
| | | Taste: Strawberry No acidic taste | Very obvious Strawberry taste |
| | | Texture: Firm | |
| Strawberries | 5 | Appearance: Excellent natural colour | |
| | | Taste: Strawberry No acidic taste | Very obvious, intense Strawberry taste |
| | | Texture: Firm | |
| Strawberries | 6 | Appearance: Excellent natural colour | |
| | | Taste: Strawberry No acidic taste | Very obvious, intense Strawberry |
| | | Texture: firm | |
| Strawberries | 8 | Appearance: tissue breaking down. | |
| | | Taste: | Not edible |
| | | Texture: Very soft | |

The invention claimed is:

1. A method for the prevention, mitigation or slowing of the discolouration of fruit the method comprising:
    (i) an first step of pre-dipping the fruit in a chelating agent, wherein the chelating agent comprises a combination of citric acid and tannic acid and derivatives thereof; and
    (ii) treating the pre-dipped fruit with an enzyme inhibitor, wherein the enzyme inhibitor comprises tannic acid or a derivative thereof.

2. A method according to claim 1 wherein the amount of chelating agent present is from about 0.1% to about 5% (w/v).

3. A method according to claim 1 which further comprises the simultaneous treatment of the fruit with a combination of a chelating agent, an enzyme inhibitor, and one or more of an antioxidant, a flavour enhancer and a sugar.

4. A method according to claim 3 wherein the amount of the antioxidant is from about 0.25% to about 6.0% (w/v).

5. A composition suitable for the prevention of the discolouration of fruit comprising a pre-dipping chelating component, wherein the chelating component comprises a combination of citric acid and tannic acid and derivatives thereof; and an enzyme inhibitor component, wherein the enzyme inhibitor component comprises tannic acid or a derivative thereof.

6. Fruit treated with the composition of claim 5 according to the method of claim 1.

7. A composition according to claim 5 wherein the amount of chelating agent present is from about 0.1% to about 5% (w/v).

8. A composition according to claim 5 which comprises a combination of the chelating agent, the enzyme inhibitor, and one or more of an antioxidant, a flavour enhancer and a sugar for the simultaneous treatment of fruit.

9. A composition according to claim 8 wherein the amount of the antioxidant is from about 0.25% to about 6.0% (w/v).

* * * * *